US000001097H

United States Statutory Invention Registration [19]

[11] Reg. Number: H1097

[43] Published: Aug. 4, 1992

Burnham et al.

[54] METHOD FOR VALIDATING RADIOGRAPHIC INSPECTION OF PROJECTILE

[75] Inventors: Michael J. Burnham, Kingsville; Donny W. Bromley, Bel Air; Paul L. Stewart, Joppa, all of Md.

[73] Assignee: The United States of America as represented by the Secretary of the Army, Washington, D.C.

[21] Appl. No.: 706,482

[22] Filed: May 28, 1991

[51] Int. Cl.[5] ..... G01D 18/00; G01B 15/02

[52] U.S. Cl. ..... 378/207; 378/56; 378/57; 378/89

[58] Field of Search ..... 378/207, 89, 57, 56, 378/141

[56] References Cited

U.S. PATENT DOCUMENTS 4,604,649 8/1986 Carollo et al. ..... 378/141

*Primary Examiner*—Bernarr E. Gregory

*Attorney, Agent, or Firm*—Anthony T. Lane; Edward Goldberg; Michael Sachs

[57] ABSTRACT

This invention provides a method used for radiographic inspection of material within a container, where the container is a dense material and the contents to be radiographically inspected are of a less dense material.

5 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR VALIDATING RADIOGRAPHIC INSPECTION OF PROJECTILE

GOVERNMENTAL INTEREST

The invention described herein may be made, used or licensed by or for the Government for Governmental purposes without the payment to the inventors of any royalties thereon or therefor.

BACKGROUND

In early 1990, there was an increase in the failure of M825A1 projectile bursters to function during projectile firings. This was subsequently determined to be due to the presence of voids or cracks with the A-5 explosive within the burster tube. Each such failure results in the loss of hundreds of dollars of U.S. Army funds.

Even though it is required that each projectile burster be x-rayed to detect voids, cracks or foreign materials with the explosive, these x-rays are not consistently reliable. The problem in x-raying the projectile burster contents is that the x-ray must pass through the dense metal burster tube and accurately x-ray the less dense explosive material. Prior to the present invention there was no way to ensure that an absence of indicators on the developed film indicated explosive consolidation rather than a failure of the equipment to detect cracks, voids or foreign material through the metal tube walls caused by mis-calibration or mis-focus of the x-ray machine.

SUMMARY

The present invention has provided a method which ensures that each x-ray machine used to x-ray projectile bursters will be properly focused and calibrated. The method of the present invention involves x-raying a burster tube which contains a explosive simulant having a predetermined density and size. The x-ray film is evaluated to determine whether the x-ray machine's calibration and focus need to be adjusted.

Additionally, the burster tube x-ray film from a properly calibrated and focused x-ray machine can be used as a visual comparison for assessing the size of gaps/-voids in a projectile burster containing an actual explosive.

DETAILED DESCRIPTION

This invention provides a method by which to validate the calibration and focus of an x-ray machine used for the radiographic inspection of projectile bursters. One aspect of the present invention provides for the use of a penetrometer, in the form of a metal burster tube which contains an explosive simulant in the form of pellets which have a known density and dimensions. The exact dimensions of the explosive simulant pellets allow for gaps/voids of a predetermined widths and depths between the pellets. An x-ray photograph of the explosive simulant containing burster is taken, and the quality and visibility of the gaps or voids on the x-ray film of the explosive simulant containing burster are used to evaluate and adjust the calibration and focus of the x-ray machine. Preferably, the density of the explosive-simulating pellets is similar to that of the explosive which is used in the projectile burster. The dimensions of the pellets allow for gaps between the pellets having a width of 0.01 inch and depth of 0.05 inch.

Another aspect of the present invention provides a method for inspecting projectile bursters using a calibrated and focused x-ray machine. X-rays are taken of a projectile burster containing explosive pellets simulant in place of the regular explosive and also of a projectile burster containing explosive. Then the two x-ray films are visually compared. Excessive gaps or voids in the explosive contained within the projectile burster may result in the failure of the projectile burster to explode. Therefore inspection of the projectile bursters by this radiographic method provides a criteria by which x-rays of projectile bursters can be evaluated. The criteria used to judge the acceptance or rejection of the projectile burster are as follows: Longitudinal and traverse gaps or voids of less than 0.010 inch wide are permitted. A single longitudinal gap or void may extend a maximum of 8 inches in length. However, the aggregate length of cracks in any one projectile burster shall not exceed 12 inches.

Another embodiment of the present invention provides for the validation of the radiographic inspection of a M825A1 projectile burster, which contains an A-5 explosive. The simulant pellets contained within the penetrometer are made of inert plastic, preferably a polyacetyl polymer which has a density of 1.41–1.43 close to that of the A-5 explosive. The pellets have exact dimensions which provide for a gap or void between the pellets which is 0.01 inch wide and 0.05 inch deep.

The present invention is not limited to the inspection of projectile bursters. The methodology of placing a material of a known density within a container, can be adapted by one skilled in the art for the validation of radiographic instruments used to x-ray through any dense material to actually x-ray inspect the less dense material contained within.

We claim:

1. A method of inspecting projectile bursters using a properly calibrated and focused machine comprising:
   - x-raying a projectile burster containing explosive simulant pellets,
   - x-raying a projectile burster containing explosive which is to be inspected, comparing the x-ray films of the projectile burster to that of the burster containing the explosive simulant pellets, and
   - evaluating the x-ray film of the projectile burster based on criteria specific to the burster and explosive it contains.

2. A method as in claim 1, wherein said projectile burster to be inspected is a M825A1.

3. A method as in claim 2, wherein said projectile burster contains an A-5 explosive.

4. A method as in claim 3, wherein said criteria are:
   - (i) longitudinal and traverse gaps or voids of less than 0.010 inch wide are permitted,
   - (ii) a single longitudinal gap or void may extend a maximum of 8 inches in length, and
   - (iii) an aggregate length of gaps or voids in any one of said projectile burster cannot exceed 12 inches.

5. A method of inspecting x-ray film of a material within a container to determine the acceptibility or unacceptibility of gaps or voids in the material using a properly calibrated and focused machine comprising:
   - x-raying a test container containing pellets having a predetermined density and predetermined size,
   - x-raying a container containing material which is to be inspected, comparing the x-ray films of the material to be inspected to that of the test container, and
   - evaluating the x-ray film of the material being inspected based upon criteria specific to the container and material it contains.

* * * * *